April 3, 1934.  A. A. WELLER  1,953,322
BOX FASTENER
Filed May 28, 1932
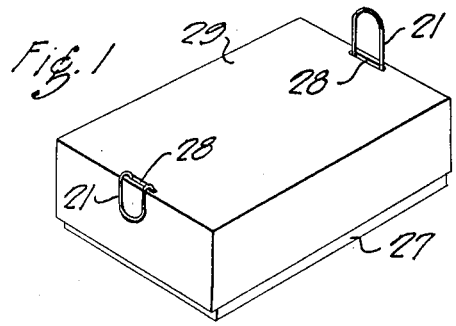
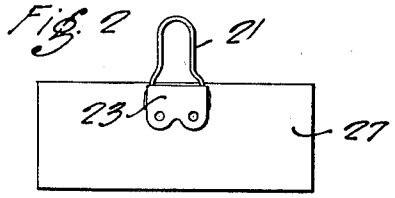
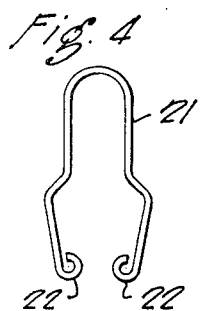
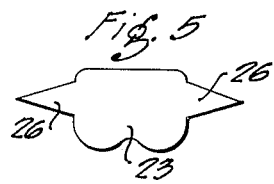
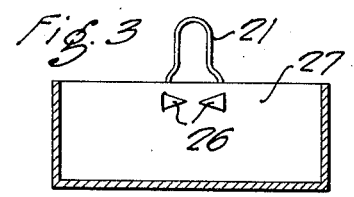
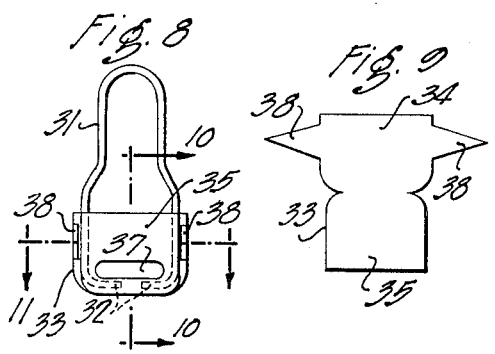
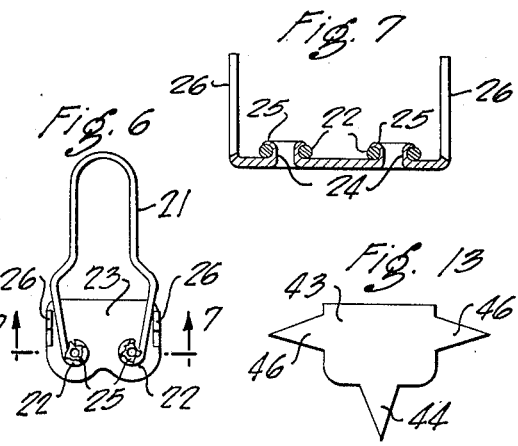
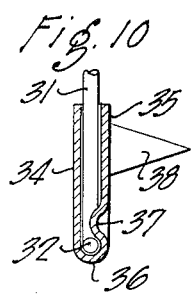
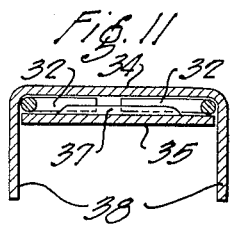
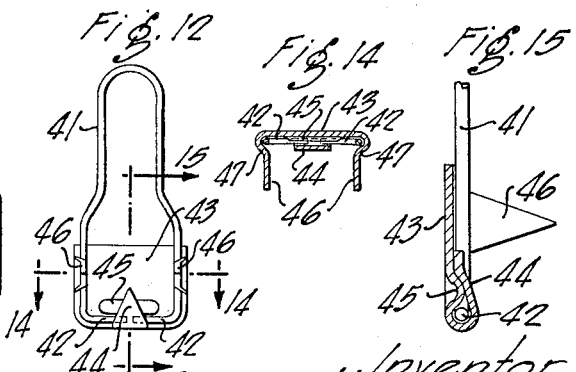
Inventor
Arthur A. Weller
by Roberts, Cushman & Woodberry
Attys Patented Apr. 3, 1934

1,953,322

UNITED STATES PATENT OFFICE 1,953,322

BOX FASTENER

Arthur A. Weller, Providence, R. I., assignor to The Mason Box Company, Attleboro, Mass., a corporation of Massachusetts Application May 28, 1932, Serial No. 614,231

8 Claims. (Cl. 292—253)

This invention relates to box fasteners of the deformable type suitable for detachably retaining the closed lid or cover of a pasteboard mailing box, and the principal purpose of the invention is to provide a made-up fastener in which a bendable loop or tab of ductile wire is firmly attached to a sheet metal shield having retaining elements for quickly securing the composite fastener to the box body.

A fastener of the general class to which this invention pertains is described in my copending application Serial No. 523,403, filed March 18, 1931, now United States Patent No. 1,864,780, but in my prior disclosure, the shield or saddle member is not connected to the wire loop until both elements are applied and simultaneously secured to the box. In many instances this operation is difficult to perform by hand, and it is contemplated that the two parts of the fastener will be attached to the box by a machine arranged to support and manipulate both units simultaneously.

The present invention is intended to avoid the necessity of machine application by providing a composite, two part fastener having the useful advantages of the prior arrangement and also providing a composite unit or made-up fastener which may be sold for direct manual attachment to the box. It will be evident, however, that the improved fastener may be applied by machine if desired and that suitable tools may be utilized in effecting a secure attachment to the box.

Recommended embodiments of this invention are illustrated in the accompanying drawing, in which:

Fig. 1 is a perspective view of a box equipped with one form of the improved fastener;

Fig. 2 is an end elevation of the box with the lid removed;

Fig. 3 is a section through the box of Fig. 2;

Figs. 4 and 5 are plan views of the wire loop and shield members respectively of the fastener, prior to assemblage;

Fig. 6 is a rear view of the assembled, composite fastener;

Fig. 7 is an enlarged section on line 7—7 of Fig. 6;

Fig. 8 is a view similar to Fig. 6, but showing a modified form of fastener according to this invention;

Fig. 9 is a plan view of the blank from which the shield member of the modified fastener is produced;

Figs. 10 and 11 are enlarged sections taken on lines 10—10 and 11—11 respectively of Fig. 8;

Fig. 12 is a view similar to Fig. 6 or 8 but illustrating a further modification of the improved fastener;

Fig. 13 is a plan view of the shield member of this fastener; and

Figs. 14 and 15 are enlarged sections taken on lines 14—14 and 15—15 respectively of Fig. 12.

In the particular embodiment chosen for the purpose of illustration in Figs. 1 to 7, the composite fastener includes a loop member 21 of ductile wire bent in U-shape and having it ends hooked or curled inwardly to provide eyes 22; and a shield or plate 23 formed from a blank of sheet metal (Fig. 5) applied to and covering the end portions or legs of the loop and secured thereto by tubular rivet portions 24 struck inwardly from the face of the plate through the eyes 22 and headed over to provide annular shoulders 25 engaging the respective ends of the loop member. The two members of the fastener are thus locked together to produce a made-up fastener unit which is ready for attachment to the box.

The shield or saddle 23 has integral side tabs or tongues 26 bendable rearwardly as shown in Figs. 6 and 7 for piercing the box wall 27, whereby the fastener may be quickly secured to the box by clenching the ends of the pointed tongues against or into the inner surface of the wall 27 (Fig. 3). When properly applied in this fashion, the deformable upper portion of the loop 21 projects above the edge of the box and is adapted to be inserted through a complemental slot 28 formed in the cover or lid 29 and to be bent over as shown at the left of Fig. 1 to hold the closed cover firmly in position. The shield 23 extends approximately to the edge of the box and conceals the end portions of the loop legs, thereby obviating accidental detachment of the fastener members and guarding the sharp tips of the loop against contact with the person of the user.

In the optional form shown in Figs. 8 to 11, the loop 31 has its ends 32 bent or hooked inwardly toward each other, and the shield 33 is folded upon itself to provide front and rear plates 34 and 35 respectively. The leg portions of the loop are received between these plates and the inwardly bent extremities 32 seat at the bottom fold 36 of the shield. A portion of the rear plate is struck inwardly to provide a retaining shoulder 37 which engages over the ends 32 to lock the loop legs within the shield. The front portion 34 of the shield has the rearwardly bent attaching tongues 38 of the previous embodiment, and the unit fastener is applied to the box in the same manner.

The further modification illustrated in Figs. 12 to 15 comprises a loop 41 having inwardly directed ends 42 similar to those of the loop 31, and a shield 43 provided with a bottom tongue 44 bent rearwardly and upwardly over the extremities of said ends to provide a lower seat therefor. The shield also has an inwardly struck rib or shoulder 45 engaging over the upper surface of the loop ends to lock the leg portions of the loop member to the shield. The side tongues 46 are formed with inwardly bent shoulders 47 which embrace the legs of the loop and assist in holding the loop member against displacement relative to the shield. This form of made-up fastener may also be secured to a box in the manner above explained.

It is evident from the foregoing that each of the illustrated embodiments comprises a loop formed of ductile wire and a shield of sheet metal or other suitable flexible sheet material which will serve to reinforce the loop member and provide a cover plate which conceals the ends of the loop when the fastener is attached to a box by the bendable side tongues of the shield. The loop legs are applied to one surface of the shield and are held against said surface by integral shoulders or deformations formed to engage the end portions of the loop, thereby to secure the loop and shield together as a composite unit. The retaining tongues are bendable rearwardly at opposite sides of the loop, thus assisting in enclosing the loop legs of the attached fastener. The unit may be sold as a made-up fastener to box manufacturers for direct application to the box without complicated attaching mechanism.

When applied to a box in the manner indicated, the fastener exhibits the characteristic advantages of a durable and easily bendable wire loop, and the shield covers and conceals the ends of the loop and provides a smooth-surfaced plate on the exterior of the box. Except as the invention is defined in the following claims, it will be understood that the structural details of the construction herein described may be varied to suit particular purposes without departing from the essence of this invention.

I claim:

1. A box fastener unit of the type described, comprising a loop of ductile wire having a hooked end portion and a shield of sheet metal, the legs of the loop being applied to one side of the shield and the shield having a deformed shoulder engageable with the hooked end portion of the loop for holding the loop against displacement relative to the shield, the shield having retaining tongues projecting at opposite sides of the secured loop for attaching the fastener to a box.

2. A box fastener unit of the type described, comprising a loop of ductile wire having hooked end portions, a shield of sheet metal, means including deformed shoulders struck from the body of the shield for securing the hooked end portions of the loop against the rearward surface of the shield, and tongues integral with and bendable rearwardly of the shield for attaching the fastener to a box.

3. A box fastener unit of the type described, comprising a loop of ductile wire and a shield of sheet metal, the legs of the loop being applied to the rearward surface of the shield and having inturned ends, the shield having deformed shoulders engaging said ends to secure the loop thereto and having rearwardly bendable tongues projecting at opposite sides of the loop for attaching the fastener to a box.

4. A box fastener unit of the type described, comprising a loop of ductile wire and a sheet metal shield, the legs of the loop being applied to the rearward surface of the shield and having curled ends providing eyes at the extremities of the loop, and the shield having deformed shoulders struck rearwardly through the respective eyes and engaging said curled ends to secure the loop to the shield, and the shield having side tongues bendable rearwardly thereof for attaching the fastener to a box.

5. A box fastener unit of the type described, comprising a loop of ductile wire, and a sheet metal shield folded upon itself to provide opposed plates, the legs of the loop extending between said plates and having inturned ends seating against the fold of the shield, one of said plates having an inwardly deformed shoulder engaging over said loop ends to secure the loop and shield together, and the other plate having side tongues for attaching the fastener to a box.

6. A box fastener unit of the type described, comprising a loop of ductile wire and a sheet metal shield having integral tongues at its sides and bottom, the legs of the loop being applied to the rearward surface of the shield and having inturned ends disposed adjacent the bottom of the shield, said bottom tongue being bent rearwardly and upwardly against said ends, and the shield having a rearwardly offset shoulder engaging the top portions of said loop ends, thereby to secure the loop and shield together, the side tongues being bendable rearwardly of the shield for attaching the fastener to a box.

7. A box fastener unit of the type described, comprising a loop of ductile wire and a sheet metal shield having integral tongues at its sides and bottom, the legs of the loop being applied to the rearward surface of the shield and having inturned ends disposed adjacent the bottom of the shield, said bottom tongue being bent rearwardly and upwardly against said ends, and the shield having a rearwardly offset shoulder engaging the top portions of said loop ends, thereby to secure the loop and shield together, the side tongues being bent rearwardly at opposite sides of the loop and having inwardly directed shoulders engaging the respective legs of the loop.

8. A fastener unit of the type described, comprising a loop member of ductile wire having a hooked end portion, a shield member of sheet material, means integral with said shield member for securing the looped member thereto to form the unit, said means including an inwardly struck protuberance engaging the hooked end portion of the loop member and firmly securing the same to said shield member, and means integral with one of said members for attaching the fastener unit to a box.

ARTHUR A. WELLER.